US012198063B2

(12) United States Patent
Gyllenhammar et al.

(10) Patent No.: US 12,198,063 B2
(45) Date of Patent: Jan. 14, 2025

(54) SYSTEM AND METHOD FOR FEDERATED LEARNING OF SELF-SUPERVISED NETWORKS IN AUTOMATED DRIVING SYSTEMS

(71) Applicant: ZENSEACT AB, Gothenburg (SE)

(72) Inventors: Magnus Gyllenhammar, Pixbo (SE); Adam Tonderski, Västra Frölunda (SE)

(73) Assignee: ZENSEACT AB, Gothenburg (SE)

( * ) Notice: Subject to any disclaimer, the term of this patent is extended or adjusted under 35 U.S.C. 154(b) by 115 days.

(21) Appl. No.: 18/182,629

(22) Filed: Mar. 13, 2023

(65) Prior Publication Data

US 2023/0297845 A1  Sep. 21, 2023

(30) Foreign Application Priority Data

Mar. 15, 2022  (EP) ..................................... 22162202

(51) Int. Cl.
*B60W 60/00* (2020.01)
*B60W 30/02* (2012.01)
(Continued)

(52) U.S. Cl.
CPC ........... *G06N 3/098* (2023.01); *G05B 13/027* (2013.01); *G05B 13/048* (2013.01); *G06F 8/65* (2013.01);
(Continued)

(58) Field of Classification Search
CPC .... G06N 3/098; G06N 3/0895; G05B 13/027; G05B 13/048; G06F 8/65; B60W 2556/45; B60W 50/0098
See application file for complete search history.

(56) References Cited

U.S. PATENT DOCUMENTS 11,511,775 B2 * 11/2022 Kain .................... B60W 50/023
12,037,023 B2 *  7/2024 Ran .................... B60W 60/0027
(Continued)

FOREIGN PATENT DOCUMENTS

| CN | 112700639 A | 4/2021 |
|---|---|---|
| CN | 113516227 A | 10/2021 |
| WO | 2021/056043 A1 | 4/2021 |

OTHER PUBLICATIONS

European Search Report mailed Sep. 15, 2022 for European Application No. 22162202.0, 10 pages.
Diao, Enmao et al.; "SemiFL: Communication Efficient Semi-Supervised Federated Learning with Unlabeled Clients"; arxiv.org; Cornell University Library; Ithaca, NY; Jan. 29, 2022; 24 pages.
(Continued)

*Primary Examiner* — Thuy Dao
(74) *Attorney, Agent, or Firm* — Sage Patent Group

(57) ABSTRACT

A computer implemented method and related aspects for updating a perception function of a plurality of vehicles having an Automated Driving System (ADS) are disclosed. The method includes obtaining one or more locally updated model parameters of a self-supervised machine-learning algorithm from a plurality of remote vehicles, and updating one or more model parameters of a global self-supervised machine-learning algorithm based on the obtained one or more locally updated model parameters. Further, the method includes fine-tuning the global self-supervised machine-learning algorithm based on an annotated dataset in order to generate a fine-tuned global machine-learning algorithm comprising one or more fine-tuned model parameters. The method further includes forming a machine-learning algorithm for an in-vehicle perception module based on the fine-tuned global machine-learning algorithm, and transmitting one or more model parameters of the formed machine-learning algorithm for the in-vehicle perception module to the plurality of remote vehicles.

15 Claims, 6 Drawing Sheets

(51) Int. Cl.
  *B60W 40/08* (2012.01)
  *G05B 13/02* (2006.01)
  *G05B 13/04* (2006.01)
  *G06F 8/65* (2018.01)
  *G06F 9/445* (2018.01)
  *G06F 9/455* (2018.01)
  *G06N 3/08* (2023.01)
  *G06N 3/0895* (2023.01)
  *G06N 3/098* (2023.01)
  *G08G 1/01* (2006.01)
  *B60W 50/00* (2006.01)

(52) U.S. Cl.
  CPC ....... *G06N 3/0895* (2023.01); *B60W 50/0098* (2013.01); *B60W 2556/45* (2020.02)

(56) References Cited

U.S. PATENT DOCUMENTS

| | | |
|---|---|---|
| 2019/0042937 A1 | 2/2019 | Sheller et al. |
| 2021/0112441 A1 | 4/2021 | Sabella et al. |
| 2021/0350150 A1 | 11/2021 | An et al. |

OTHER PUBLICATIONS

Wang, Jin et al.; "Federated Ensemble Model-based Reinforcement Learning"; arxiv.org; Cornell University Library, Ithaca, NY; Sep. 12, 2021; 14 pages.
Saeed, Aaqib et al.; "Federated Self-Supervised Learning of Multi-Sensor Representations for Embedded Intelligence"; IEEE Internet of Things Journal; arxiv.org; Cornell University Library, Ithaca, NY; Jul. 25, 2020; 11 pages.
Bao, Hangbo et al.; "BEiT: BERT Pre-Training of Image Transformers"; arxiv.org; Cornell University Library, Ithaca, NY; Sep. 3, 2022; 18 pages.
He, Kaiming et al.; "Masked Autoencoders Are Scalable Vision Learners"; Facebook AI Research (FAIR); arxiv.org; Cornell University Library; Ithaca, NY; Dec. 19, 2021; 14 pages.
Xie, Zhenda et al.; "SimMIM: A Simple Framework for Masked Image Modeling"; arxiv.org; Cornell University Library; Ithaca, NY; Apr. 17, 2022; 13 pages.
Zhou, Jinghao et al.; "iBOT: Image BERT Pre-Training with Online Tokenizer"; arxiv.org; Cornell University Library; Ithaca, NY; Jan. 27, 2022; 29 pages.
Hinton, Geoffrey et al.; "Distilling the Knowledge in a Neural Network"; arxiv.org; Cornell University Library; Ithaca, NY; Mar. 9, 2015; 9 pages.

* cited by examiner

SYSTEM AND METHOD FOR FEDERATED LEARNING OF SELF-SUPERVISED NETWORKS IN AUTOMATED DRIVING SYSTEMS

CROSS-REFERENCE TO RELATED APPLICATIONS

The present application for patent claims priority to European Patent Office Application Ser. No. 22162202.0, entitled "SYSTEM AND METHOD FOR FEDERATED LEARNING OF SELF-SUPERVISED NETWORKS IN AUTOMATED DRIVING SYSTEMS" filed on Mar. 15, 2022, assigned to the assignee thereof, and expressly incorporated herein by reference.

TECHNICAL FIELD

Embodiments disclosed herein generally relate to systems and methods for updating a perception function of a plurality of vehicles having an Automated Driving System (ADS). In particular, embodiments disclosed herein relates to systems and methods for federated learning of self-supervised machine-learning algorithms in ADSs.

BACKGROUND

During the last few years, the research and development activities related to autonomous vehicles have exploded in number and many different approaches are being explored. An increasing portion of modern vehicles have advanced driver-assistance systems (ADAS) to increase vehicle safety and more generally road safety. ADAS—which for instance may be represented by adaptive cruise control (ACC) collision avoidance systems, forward collision warning systems, etc. —are electronic systems that may aid a vehicle driver while driving. Today, there is ongoing research and development within a number of technical areas associated to both the ADAS and Autonomous Driving (AD) field. ADAS and AD will herein be referred to under the common term Automated Driving System (ADS) corresponding to all of the different levels of automation as for example defined by the SAE J3016 levels (0-5) of driving automation, and in particular for level 4 and 5.

In a not too distant future, ADS solutions are expected to have found their way into a majority of the new cars being put on the market. An ADS may be construed as a complex combination of various components that can be defined as systems where perception, decision making, and operation of the vehicle are performed by electronics and machinery instead of a human driver, and as introduction of automation into road traffic. This includes handling of the vehicle in traffic, as well as forming an awareness of the surroundings. While the ADS has control over the vehicle, it allows the human operator to leave all or at least some responsibilities to the system. An ADS commonly combines a variety of sensors to perceive the vehicle's surroundings, such as e.g. radar, LIDAR, sonar, camera, navigation system e.g. GPS, odometer and/or inertial measurement units (IMUs), upon which advanced control systems may interpret sensory information to identify appropriate navigation paths, obstacles, free-space areas, relevant signage, and so forth.

Machine Learning (ML), such as Deep Learning (DL), is a promising technology in the area of perception, for example in order to detect and classify objects in images, video streams and/or LIDAR point clouds. However, the problem with many deep neural networks is that they quickly reach some level of performance (maturity), and that extremely large amounts of data are required to get further improved performance. Annotating millions of images is expensive, and hence many initiatives are taken in the autonomous driving field to reduce this cost through semi-automated annotation and learning efficiently from annotated data. However, even with these advances it is still a very costly process.

There is accordingly a need in the art for new solutions for facilitating development of ADS functions, and in particular for the ADS's perception functionality, in order to continuously be able to provide safer and better performing systems. As always, the improvements shall preferably be made without significant negative impact on the size, power consumption and cost of the on-board system or platform.

SUMMARY

The present invention seeks to mitigate, alleviate or eliminate one or more of the above-identified deficiencies and disadvantages in the prior art to address various problems relating to the development of ADS functions, and in particular for the development of an ADS's perception functionality.

Various aspects and preferred embodiments of the disclosed invention are defined below and in the accompanying independent and dependent claims.

According to a first aspect of the present invention, there is provided a computer-implemented method for updating a perception function of a plurality of vehicles having an Automated Driving System (ADS). The method comprises obtaining one or more locally updated model parameters of a self-supervised machine-learning algorithm from a plurality of remote vehicles, and updating one or more model parameters of a global self-supervised machine-learning algorithm based on the obtained one or more locally updated model parameters. Further, the method comprises fine-tuning the global self-supervised machine-learning algorithm based on an annotated dataset in order to generate a fine-tuned global machine-learning algorithm comprising one or more fine-tuned model parameters. The method further comprises forming a machine-learning algorithm for an in-vehicle perception module based on the fine-tuned global machine-learning algorithm, and transmitting one or more model parameters of the formed machine-learning algorithm for the in-vehicle perception module to the plurality of remote vehicles.

According to a second aspect of the present invention, there is provided a (non-transitory) computer-readable storage medium storing one or more programs configured to be executed by one or more processors of a processing system, the one or more programs comprising instructions for performing the method according to any one of the embodiments of the first aspect disclosed herein. With this aspect of the invention, similar advantages and preferred features are present as in the previously discussed aspect(s).

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

According to a third aspect of the present invention there is provided a processing system for updating a perception function of a vehicle having an Automated Driving System (ADS). The processing system comprising control circuitry configured to obtain one or more locally updated model parameters of a self-supervised machine-learning algorithm from a plurality of remote vehicles, and to update one or more model parameters of a global self-supervised machine-learning algorithm based on the obtained one or more locally updated model parameters. The control circuitry is further configured to fine-tune the global self-supervised machine-learning algorithm based on an annotated dataset in order to generate a fine-tuned global machine-learning algorithm comprising one or more fine-tuned model parameters. Moreover, the control circuitry is configured to form a machine-learning algorithm for an in-vehicle perception module based on the fine-tuned global machine-learning algorithm, and to transmit one or more model parameters of the formed machine-learning algorithm for the in-vehicle perception module to the plurality of remote vehicles. With this aspect of the invention, similar advantages and preferred features are present as in the previously discussed aspect(s).

According to a fourth aspect of the present invention, there is provided a remote server comprising the processing system according to any one of the embodiments of the third aspect disclosed herein. With this aspect, similar advantages and preferred features are present as in the previously discussed aspects and vice versa.

According to a fifth aspect of the present invention, there is provided a cloud environment comprising one or more remote servers according to any one of the embodiments of the fourth aspect disclosed herein. With this aspect, similar advantages and preferred features are present as in the previously discussed aspects and vice versa.

According to a sixth aspect of the present invention, there is provided a computer-implemented method, performed by an in-vehicle processing system, for updating a perception function of a vehicle having an Automated Driving System (ADS). The method comprises obtaining perception data from one or more vehicle-mounted sensors configured to monitor a surrounding environment of the vehicle, processing the obtained perception data using a self-supervised machine-learning algorithm, and locally updating one or more model parameters of the self-supervised machine-learning algorithm. The method further comprises transmitting the locally updated model parameters of the self-supervised machine-learning algorithm to a remote entity, and obtaining a centrally fine-tuned machine-learning algorithm formed from a consolidated version of the self-supervised machine-learning algorithm from the remote entity. Furthermore, the method comprises distilling a machine-learning algorithm for an in-vehicle perception module from the centrally fine-tuned machine-learning algorithm acting as a teacher model, where the distillation is performed using perception data obtained from one or more vehicle-mounted sensors. Further, the method comprises transmitting one or more model parameters of the distilled machine-learning algorithm to the remote entity, receiving one or more consolidated model parameters of the machine-learning algorithm for the in-vehicle perception module from the remote entity, and updating the machine-learning algorithm for the in-vehicle perception module based on the received one or more consolidated model parameters. With this aspect of the invention, similar advantages and preferred features are present as in the previously discussed aspect(s).

According to a seventh aspect of the present invention, there is provided a (non-transitory) computer-readable storage medium storing one or more programs configured to be executed by one or more processors of a processing system, the one or more programs comprising instructions for performing the method according to any one of the embodiments of the sixth aspect disclosed herein. With this aspect of the invention, similar advantages and preferred features are present as in the previously discussed aspect(s).

According to an eight aspect of the present invention, there is provided an in-vehicle processing system 10 for updating a perception function of a vehicle having an Automated Driving System (ADS). The processing system comprises control circuitry configured to obtain perception data from one or more vehicle-mounted sensors configured to monitor a surrounding environment of the vehicle, and process the obtained perception data using a self-supervised machine-learning algorithm and locally update one or more model parameters of the self-supervised machine-learning algorithm. The control circuitry is further configured to transmit the locally updated model parameters of the self-supervised machine-learning algorithm to a remote entity, obtain a centrally fine-tuned machine-learning algorithm formed from a consolidated version of the self-supervised machine-learning algorithm from the remote entity, and distil a machine-learning algorithm for an in-vehicle perception module from the centrally fine-tuned machine-learning algorithm (33) acting as a teacher model. The distillation is performed using perception data (50) obtained from one or more vehicle-mounted sensors. Furthermore, the control circuitry is configured to transmit one or more model parameters of the distilled machine-learning algorithm to the remote entity, receive one or more consolidated model parameters of the machine-learning algorithm for the in-vehicle perception module from the remote entity, and update the machine-learning algorithm for the in-vehicle perception module based on the received one or more consolidated model parameters. With this aspect of the invention, similar advantages and preferred features are present as in the previously discussed aspect(s).

According to a ninth aspect of the present invention, there is provided a vehicle comprising an Automated Driving System (ADS), and an in-vehicle processing system according to any one of the embodiments of the eight aspects disclosed herein. With this aspect of the invention, similar advantages and preferred features are present as in the previously discussed aspect(s).

In some embodiments, the ADS of the vehicle comprises a perception system having one or more vehicle-mounted sensors configured to monitor the surrounding environment of the vehicle.

An advantage of some embodiments is that the training of machine-learning algorithms for providing perception functionality in ADS-equipped vehicles may be rendered more cost-effective and less labour-intensive as compared to the known prior art.

An advantage of some embodiments is that is that the training of machine-learning algorithms for providing perception functionality in ADS-equipped vehicles may be rendered more efficient in general as the need for transferring huge datasets, which may contain personal data, may be alleviated, which may not even be permitted in some countries.

Additionally, some embodiments further provide the advantage of increasing the possibility to capture rare cases (may also be referred to as corner cases) that can be incorporated in the training of the production network, even further increasing the performance at a higher pace as compared to the known prior art.

Further embodiments of the invention are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present invention will in the following be further clarified with reference to the embodiments described hereinafter.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Figure 1:
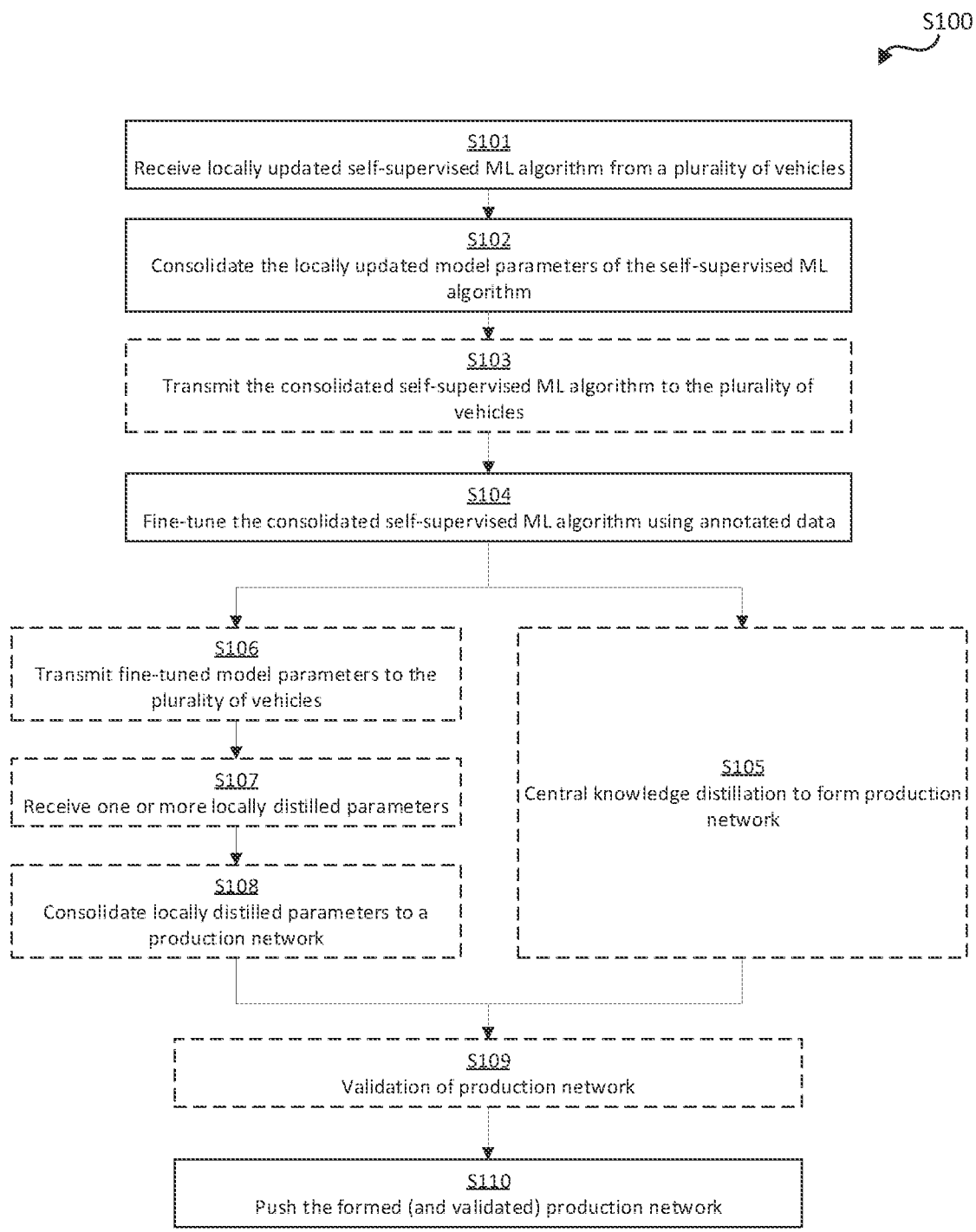
FIG. 1 is a schematic flowchart representation of a method, performed by a central processing system, for updating a perception function of a plurality of ADS-equipped vehicles in accordance with some embodiments.

In the following detailed description, embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs), Field Programmable Gate Arrays (FPGA) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context clearly dictates otherwise. Thus, for example, reference to "a unit" or "the unit" may refer to more than one unit in some contexts, and the like. Furthermore, the words "comprising", "including", "containing" do not exclude other elements or steps. It should be emphasized that the term "comprises/comprising" when used in this specification is taken to specify the presence of stated features, integers, steps, or components. It does not preclude the presence or addition of one or more other features, integers, steps, components, or groups thereof. The term "and/or" is to be interpreted as meaning "both" as well and each as an alternative. The term "obtaining" is herein to be interpreted broadly and encompasses receiving, retrieving, collecting, acquiring, and so forth.

Certain terms used in this specification are to be given the following interpretations in the description of the claims and drawings unless the context indicates otherwise. Additional examples to illustrate the scope of certain terms may also be provided in the detailed description.

In general, large volumes of training data are required in order to develop machine-learning algorithms to reach an adequate performance level for industrial purposes. This is particularly the case for "vision tasks" (i.e. perception functions), such as object detection and object classification, which commonly uses deep neural networks.

The need for large volumes of training data is even further amplified in the Autonomous Driving field, as the requirements for reaching the necessary integrity and performance levels before one can deploy an ADS in the field (i.e. in traffic), are immense. However, one general challenge that is associated with the acquisition of large volumes of training data for ADS development purposes such as the generation of annotated datasets is that they are known to be costly and/or labour-intensive. Other challenges that need to be addressed are for example related to bandwidth requirements, data storage capacity, and data privacy due to the consequential need of transmitting large, and potentially sensitive, datasets between entities.

Federated learning (FL) is a scheme where a "global" or "central" model is consolidated from "local" models trained at the edge. This is prevalent in "voice assistants" and "typing models" for e.g. smart phones. In the present context, the vehicles constitute the edge devices or nodes, while one or more remote servers may constitute the central server responsible for aggregating or consolidating the model updates from each of the edge devices. This would be referred to as centralized federated learning scheme. However, in some embodiments the need for a central entity may be omitted and the edge devices (e.g. a fleet of vehicles) may be configured to coordinate themselves to obtain the global model, as so called decentralized federated learning scheme. In the following the description is mainly given in reference to a centralized federated learning scheme. It is however presumed that those skilled in the art would readily appreciate how to implement the teachings herein to a decentralized federated learning scheme, and that the scope conveyed by the invention disclosed herein encompasses such a realization. It should be noted that the term "global" does not necessarily imply "worldwide", in the present context, but should instead be construed as something that is "shared" among a plurality of "local" entities.

A challenge that is associated with the use of Federated Learning is that the local models can only be trained if it is possible to construct a loss function (may also be referred to as a cost function). This challenge is even more prominent for supervised training in the Autonomous Driving field as it requires annotated datasets, which are as mentioned, difficult to obtain in large enough quantities. These requirements results in an almost impossible situation because it may be impossible to share the data (due to bandwidth requirements and data privacy/security reasons), and because it is generally infeasible to elicit accurate annotations of all data collected in the vehicles.

However, recently a new paradigm, using "self-supervised learning", has been proposed to, at least partly, alleviate the need for annotated data in the training process of machine-learning algorithms. Through this process the machine-learning algorithm of a perception function can be trained by using images with no need for annotations. Further background and details to the "self-supervised" learning is for example provided in Bao, H., et al. (2021), *BEiT: BERT Pre-Training of Image Transformers*; He, K., et al. (2021), *Masked Autoencoders Are Scalable Vision Learners*; Xie, Z., et al. (2021), *SimMIM: A Simple Framework for Masked Image Modeling*; Zhou, J. et al. (2021). *iBOT: Image BERT Pre-Training with Online Tokenizer.*

It is herein proposed to leverage this paradigm of "self-supervision", and to combine it with a federated learning scheme in order to provide an "edge self-supervised learning platform" for developing ADS perception functions. In short, some embodiments comprise machine-learning algorithms that are trained through self-supervised learning at the edge device (i.e. vehicle). These are subsequently consolidated centrally, and the consolidated model is fine-tuned to construct a highly performant "teacher-type network" or "teacher network". The teacher-type network may then be used to train a "production network"—i.e. a machine-learning algorithm that is provided in an ADS for perception functionality—in an efficient manner by having the production network act as a "student-type network" or "student network". The formed production network is subsequently pushed to the ADS-equipped vehicles in the fleet in a global software update procedure.

Accordingly, by means of the technology disclosed herein, one can efficiently incorporate the various scenes and scenarios that the vehicles of the fleet are exposed to during normal operation in the training of the production network without the need for either transmitting huge datasets or annotating the data collected by each vehicle. Consequently, an efficient process for increasing the performance of the "production network" is readily achievable. Moreover, an efficient expansion of the production network's operational capability into new regions and new use cases (i.e. Operational Design Domain expansion) at a faster pace is readily achievable.

An Operational design domain (ODD) is to be understood as a description of the operating domains in which an automated or a semi-automated driving system (i.e. AD or ADAS) is designed to function, including, but not limited to, geographic, roadway (e.g. type, surface, geometry, edges and markings), environmental parameters, connectivity, surrounding objects, and speed limitations. That is, the production network of the ADS may be associated with a specific environmental scenario and only configured to operate within an environment fulfilling a set of "scenario parameters", example scenarios are traffic jams, highway/expressway cruising, etc. The ODD may further define an allowable exposure rate to driving scenarios and their dynamics (e.g. traffic lights, intersections, jaywalkers, snow, ice, cut-ins, large animals, etc.). The "scenario parameters" may for example be obtained from sensor data from one or more vehicle-mounted sensors or communication data obtained from a remote server, or another vehicle via a Vehicle-to-Vehicle (V2V) communication protocol. The scenario parameters may for example be type of road, weather data, speed limitations, traffic density, number of available lanes, presence of road work, and so forth.

Thus, an advantage of some embodiments is that the training of machine-learning algorithms for providing perception functionality in ADS-equipped vehicles may be rendered more cost-effective and less labour-intensive as compared to the known prior art.

An advantage of some embodiments is that is that the training of machine-learning algorithms for providing perception functionality in ADS-equipped vehicles may be rendered more efficient in general as the need for transferring huge datasets, which may contain personal data, may be alleviated, which may not even be permitted in some countries.

Additionally, some embodiments further provide the advantage of increasing the possibility to capture rare cases (may also be referred to as corner cases) that can be incorporated in the training of the production network, even further increasing the performance at a higher pace as compared to the known prior art.

The machine-learning algorithms (may also be referred to as machine-learning models, neural networks, and so forth) are implemented in some embodiments using publicly available suitable software development machine learning code elements, for example, such as those which are available in Python, Keras and TensorFlow or in any other suitable software development platform, in any manner known to be suitable to someone of ordinary skill in the art.

FIG. 1 is a schematic flowchart representation of a method S100, performed by a central processing system, for updating a perception function of a plurality of ADS-equipped vehicles in accordance with some embodiments. The central processing system may also be referred to as a "fleet management system", "back-office", "the cloud", and so forth. Thus, the term "central" need not necessarily be interpreted as "centralized" as the resources could be distributed and configured to jointly perform the method S100 in accordance with some embodiments.

Figure 2:
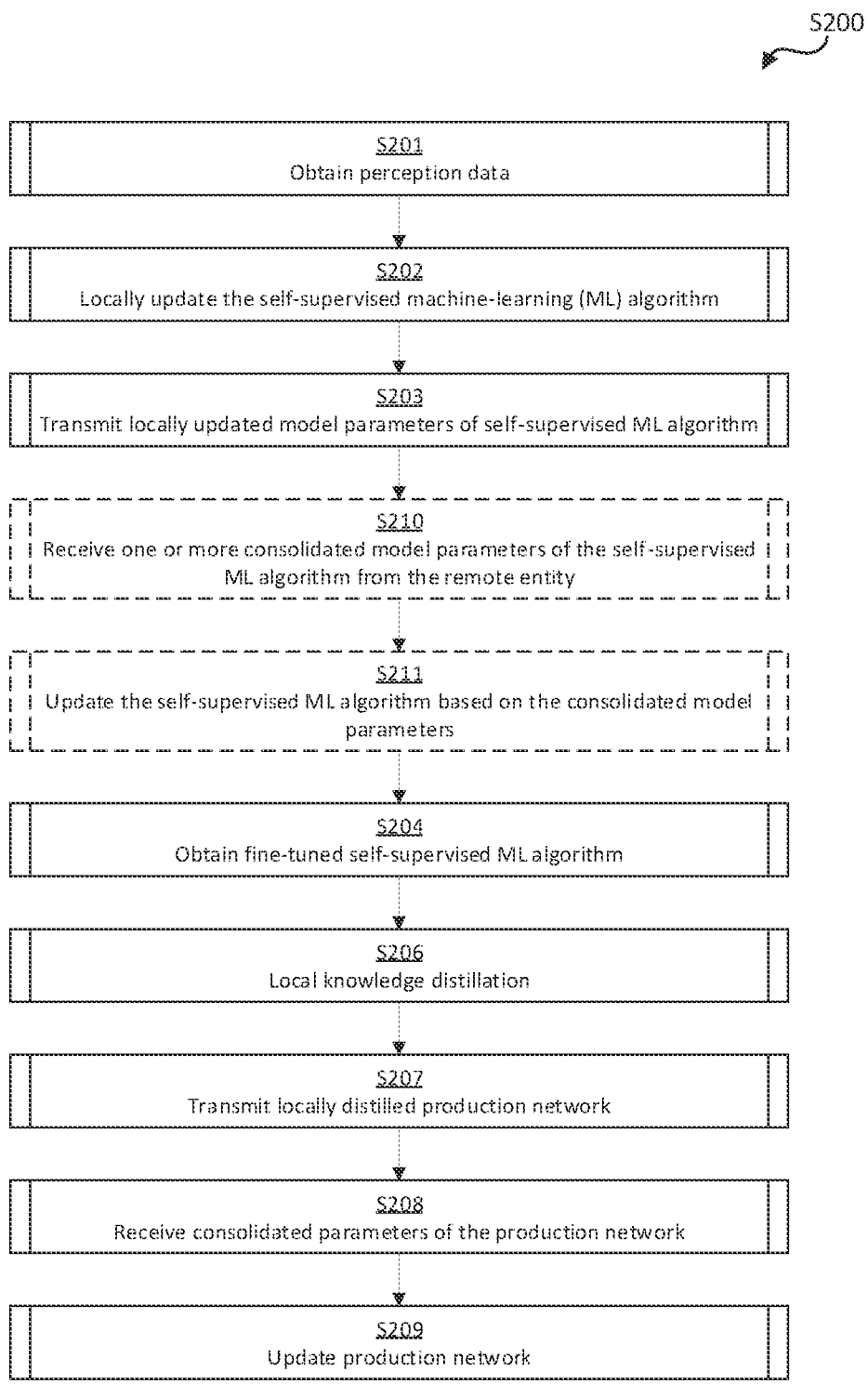
FIG. 2 is a schematic flowchart representation of a method for updating a perception function of an ADS-equipped vehicle in accordance with some embodiments.

FIG. 2 is a schematic flowchart representation of a method S200, performed by an in-vehicle processing system, for updating a perception function of an ADS-equipped vehicle in accordance with some embodiments.

Figure 3:
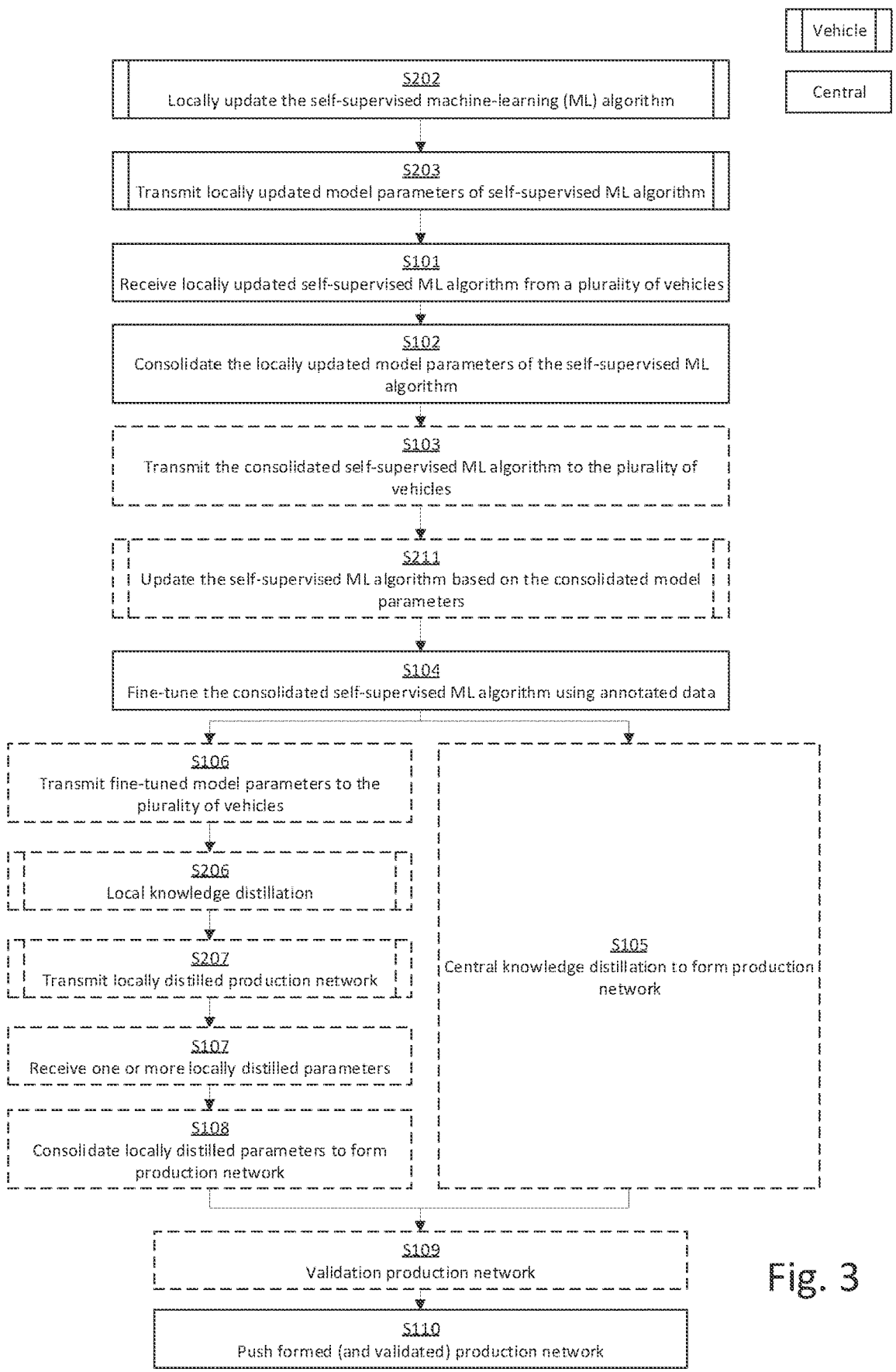
FIG. 3 is a schematic flowchart representation of a method, performed by an in-vehicle processing system, for updating a perception function of a plurality of ADS-equipped vehicles in accordance with some embodiments.

It should be noted that the depicted flowchart of FIG. 3 serves to further elucidate how the perception functions of a plurality of ADS-equipped vehicles are updated through a cooperation between the "central server" (i.e. central processing system) and the edge devices (i.e. ADS-equipped vehicles). In other words, FIG. 3 illustrates an example embodiment where the embodiments depicted in FIGS. 1 and 2 are combined. The flowchart representation of the method in FIG. 3 is accordingly illustrated from a "system perspective" meaning that some functions are performed by an in-vehicle processing system (i.e. at the edge) and some functions are performed by the central processing system as indicated by the different box-types in the flowchart in accordance with the explanation in the top-right corner of FIG. 3.

Reverting back to FIG. 1, which shows a schematic flowchart representation of a computer-implemented method S100, suitably performed by a central processing system in communication with a plurality of ADS-equipped vehicles, for updating a perception function of the plurality of ADS-equipped vehicles in accordance with some embodiments. The central processing system may for example comprise one or more processors and one or more memories coupled to the one or more processors, wherein the one or more memories store one or more programs that perform the steps, services and functions of the method S100 disclosed herein when executed by the one or more processors.

The method S100 comprises obtaining S101 one or more locally updated model parameters of a self-supervised machine-learning algorithm from a plurality of remote vehicles. It should be noted that the term "locally" is in reference to each vehicle, i.e. updated locally in each vehicle, while the vehicles are still to be understood as "remote" in reference to the central processing system.

A "self-supervised machine-learning algorithm" is in the present context to be understood as a machine-learning algorithm (e.g. an artificial neural network) that does not require labelled or annotated data to learn. In some embodiments, the self-supervised machine-learning algorithm is an autoencoder (AE), such as a Masked Autoencoder (MAE). In some embodiments, the self-supervised machine-learning algorithm is trained by manipulating (e.g. withholding) parts of an image and instructing the algorithm to reconstruct the manipulated image as part of its learning process. The reconstructed image is subsequently compared to the original image to create a loss function, which is used to update the model parameters (e.g. network weights and/or biases), as known in the art. The manipulation of the image(s) may for example be performed through masking, adding noise to the image, or a similar methodology as readily understood by a person skilled in the art. However, in some embodiments, the input data does not need to be manipulated in order to train the machine-learning algorithm but may instead be trained with a "raw input", such as for example in a conventional autoencoder. Thus, in some embodiments the self-supervised machine-learning algorithm may comprise an unsupervised machine-learning algorithm.

In general, the phrase "one or more model parameters" in reference to the obtaining or receiving steps as used herein serves to encompass embodiments where a version of the associated ML algorithm is already available at the receiving entity, wherefore only the updated model parameters (e.g. network weights and/or biases) need to be available in order to update the entire ML algorithm. Thereby bandwidth utilization may be improved. However, as readily understood by the skilled reader, in some embodiments all of the model parameters of the associated ML algorithm is transmitted/received or otherwise communicated.

Further, the method S100 comprises updating S102 one or more model parameters of a global self-supervised machine-learning algorithm based on the obtained one or more locally updated model parameters. In other words, the local self-supervised ML algorithms are consolidated so to form a "global" self-supervised ML algorithm, i.e. the local model parameters of the nodes are consolidated so to form a global model.

Still further, the method S100 comprises fine-tuning S104 the global self-supervised ML algorithm based on an annotated dataset in order to generate a fine-tuned global ML algorithm comprising one or more fine-tuned model parameters. Stated differently, the global self-supervised ML algorithm undergoes a supervised learning process using a training dataset comprising annotated/labelled data. Thus, the local updating/training of the self-supervised ML algorithm and the subsequent consolidation S102 may be construed as a "pre-training" process for the fine tuning S104. The fine-tuned global ML algorithm may accordingly be understood as an ML algorithm that is tuned to do a specific task (e.g. segmentation, object detection, object classification) that differs from the task of the local and global self-supervised ML algorithms.

Moreover, once the global self-supervised ML algorithm has been fine-tuned S104, it can serve as a basis for forming a machine learning algorithm for an in-vehicle perception module. In the present context, the ML algorithm for the in-vehicle perception module may be referred to as the "production network" mentioned in the foregoing.

However, in some embodiments, the machine learning algorithm for the in-vehicle perception module (i.e. the production network) is formed from a knowledge distillation process. In such embodiments, the fine-tuned global ML algorithm acts as a "teacher network" or "teacher model", and the production network acts as a "student network" or "student model" that is trained to mimic the output of the teacher network. More specifically, the output from the teacher network is used as a "ground-truth" or "target" and the difference between the outputs from the two ML algorithms is used to form a loss function (cost function), which is used to update the model parameters (e.g. network weights and/or biases) of the production network using an optimization algorithm as known in the art. Further details and illustrative examples related to the knowledge distillation process are provided in Hinton, G. et al. (2015). *Distilling the Knowledge in a Neural Network.* 1-9.

The knowledge distillation process may be performed centrally or in accordance with a federated learning scheme as will be elaborated upon in the following.

Even though the "teacher network" may achieve a high performance for the task it has been tuned for, the "teacher network" may be too "large" and therefore too slow to be directly employed in the ADS-equipped vehicles as the processing power on board the vehicles is limited, making it difficult to use the teacher network for real-time processing in the vehicles. In more detail, the teacher network may comprise multiple (relatively large) networks, i.e. an ensemble, whose outputs are merged into a single set of "high-quality" teacher outputs. Therefore, in order to still be able to benefit from the high performance of the "teacher network" for real-time perception functions, the present inventors realized that one can utilize the "teacher network" to form a more condensed version of the "teacher network" through knowledge distillation. The distilled network may accordingly be more suitable for providing real-time perception functionality for the ADS of vehicles with limited processing power. Thus, in some embodiments, the production network is a condensed/distilled version of the "teacher network".

Accordingly, in some embodiments, the step of forming the ML algorithm for the in-vehicle perception module comprises distilling S105 a machine-learning algorithm for an in-vehicle perception module from the fine-tuned global machine-learning algorithm acting as a teacher model. Moreover, the distillation is performed using input data in the form of (stored) images of traffic scenarios. In other words, the ML algorithm for the in-vehicle perception module, i.e. the "production network", may be obtained through a central distillation S105 process, where images of traffic scenarios/scenes are obtained from a data repository accessible by the central processing system. Image of traffic scenarios/scenes are in the present context to be interpreted broadly and may be in the form of monocular camera images, stereo camera images, radar images, and/or LiDAR images. It should be note that the images may be single images or image sequences (i.e. a video feed).

However, in some embodiments, another federated learning methodology is employed for the "distillation" process. In more detail, and in accordance with some embodiments, the step of forming the ML algorithm for the in-vehicle perception module comprises transmitting S106 the fine-tuned model parameters of the fine-tuned global machine-learning algorithm to the plurality of remote vehicles, and obtaining S107 one or more locally distilled model parameters of a local machine-learning algorithm for the in-vehicle perception module from each of the plurality of remote vehicles. Subsequently, the machine-learning algorithm for the in-vehicle perception module is formed S108 based on a consolidation of the one or more locally distilled model parameters. In other words, the teacher network is pushed to the vehicles, which are provided with suitable hardware and/or software to perform a "local" knowledge distillation based on input data in the form of perception data generated locally in each of the vehicles. An advantage of using a federated learning scheme for the knowledge distillation is that the probability of successfully including rare scenarios (edge cases or corner cases) in the knowledge distillation process may be increased, further increasing the performance of the formed production network. Another advantage of using the federated learning scheme for the knowledge distillation is that the production network may converge towards the teacher network more efficiently due to the increased amount of available data.

It should be noted that the "local" knowledge distillation may be performed a plurality of times (looped) in each vehicle before the locally distilled parameters are finally transmitted to the central processing system for consolidation S108. However, in some embodiments the "loop" may also be extended so to include the consolidation S108 whereupon the local distillation is repeated with the (centrally) consolidated S108 production network until a satisfactory distillation is achieved. Similarly, the previously discussed local updating of the self-supervised ML algorithm may be comprise several local updates, that may be periodically transmitted to the central processing system (e.g. once per week, once per month, etc.) and/or in dependence of network availability, network requirements, system settings, user-settings and so forth as readily understood by the skilled reader.

Further, the method S100 comprises transmitting S110 one or more model parameters of the formed machine-learning algorithm for the in-vehicle perception module to the plurality of remote vehicles. In other words, the formed/updated "production network" is pushed S110 to the vehicle fleet.

In some embodiments, the production network and the fine-tuned S104 global ML algorithm have the same architecture. In such cases the fine-tuned S104 global ML algorithm can be used as an updated version of the production network. Accordingly, in some embodiments the transmitted S110 one or more model parameters of the production network are the one or more fine-tuned S104 model parameters.

Still further, in some embodiments, the method S100 comprises validating S109 the formed machine-learning algorithm for the in-vehicle perception module based on an annotated dataset prior to the transmission S110 of the one or more model parameters of the formed machine-learning algorithm for the in-vehicle perception module. In other words, before the "production network" is rolled-out and deployed in the remote vehicles for providing a perception functionality for the ADS of the remote vehicles, the "production network" is validated, e.g. by comparing the output of the formed "production network" against a defined ground-truth. However, as readily understood by the skilled reader, the validation S109 process of the production network may be more or less elaborate depending on context, specification, and other general requirements. For example, the validation S109 may further include running full-stack simulations on the production network, or even shadow mode testing in open loop in a plurality of ADS-equipped vehicles. In the present context, the validation S109 procedure may be understood as a process to ensure that the formed production network conforms to defined requirements and operational reliability. In reference to the aforementioned "looping", the method S100 may comprise one or more inner loops (e.g. the local updating of the self-supervised ML algorithm, the local distillation, and/or the local distillation together with the consolidation) that are performed a number of times prior to the validation S109 and final transmission S110 of the centrally updated production network.

FIG. 2 is a schematic flowchart representation of a computer-implemented method S200 performed by an in-vehicle processing system, for updating a perception function of a vehicle having an Automated Driving System (ADS). The in-vehicle processing system may for example comprise one or more processors and one or more memories coupled to the one or more processors, wherein the one or more memories store one or more programs that perform the steps, services and functions of the method S200 disclosed herein when executed by the one or more processors. The term "in-vehicle" should be understood as an implication that the processing system is provided on board the vehicle.

In comparison with the above-described embodiments in reference to FIG. 1, the method S200 exemplifies the steps or functions that are performed from the "vehicle-side" or at the "edge devices", i.e. from the perspective of one of the ADS-equipped vehicles that are in communication with the central processing system. In particular, the method S200 illustrated by the flowchart of FIG. 2 serves to illustrate some embodiments, from the vehicle-side, where the federated learning methodology is utilized for the knowledge distillation of the teacher network.

The method S200 comprises obtaining S201 perception data from one or more vehicle-mounted sensors configured to monitor a surrounding environment of the vehicle. The perception data may for example comprise raw sensor data or processed sensor data in the form of monocular camera images, stereo camera images, radar images, and/or LiDAR images. It should be note that the images may be single images or image sequences (i.e. a video feed). The step of obtaining S201 perception data "from" one or more vehicle-mounted sensors should be understood as obtaining S201 perception data that originates from one or more vehicle-mounted sensors.

The perception data may for example be stored or saved in a data buffer (not shown), and the perception data may be understood as data indicative of the vehicle's surroundings. This may for example be raw sensor data or processed sensor data that is derived continuously and/or intermittently from a first time point T1 to a second time point T2. The time period—and correspondingly the length of the optional data buffer—may be of any arbitrary size deemed feasible, e.g. in consideration of data capacity restraints and/or characteristics of the ADS, and may for instance range from under a second up to several minutes, or more preferred, from a few seconds up to less than a minute. The perception data stored in the data buffer may then be accessed and retrieved by various software and/or hardware modules for the purposes disclosed herein.

Further, the method S200 comprises processing the obtained perception data using a self-supervised machine-learning algorithm and locally updating S202 one or more model parameters of the self-supervised machine learning algorithm. As mentioned in the foregoing, in some embodiments, the self-supervised machine-learning algorithm is trained by manipulating (e.g. withholding) parts of an image comprised in the perception data, whereupon the algorithm is configured to reconstruct the manipulated image. The reconstructed image is subsequently compared to the original image to create a loss function (cost function), which is used to update the model parameters (e.g. network weights and/or biases), as known in the art. The manipulation of the image(s) may for example be performed through masking, adding noise to the image, or similar methodology.

The method S200 further comprises transmitting S203 the locally updated model parameters of the self-supervised machine-learning algorithm to a remote entity (e.g. the above-described central processing system). It should be noted that the transmission S203 need not necessarily be performed directly after every update S202. Instead, the local updating S202 process may "looped", and the transmission S203 of the locally updated S202 model parameters may be executed in accordance with a set schedule (e.g. once every week, once every months), upon request from the remote entity, or as soon as a suitable communication-network connection is available. Moreover, the local updating S202 need not be performed while the vehicle is operating in traffic (i.e. during a driving session). The local updating S202 may for example be executed while the vehicle is stationary (e.g. parked), in order to make processing resources available for other ADS functions (e.g. safety-critical functions) and avoid processing bottlenecks during operation. In that case, the step of obtaining S201 perception data may comprise (temporarily) storing the perception data and the stored perception data may later be used to locally update S202 the one or more model parameters of the self-supervised machine-learning algorithm.

In some embodiments, the method S200 comprises receiving S210 one or more one or more consolidated model parameters of the self-supervised ML algorithm from the remote entity, and updating S211 the self-supervised ML algorithm based on the consolidated model parameters. In other words, the self-supervised ML algorithm is subdued to a "global update" that is based on a plurality of "local updates" performed across an entire fleet of ADS-equipped vehicles. This, consolidated or "global" version of the self-supervised ML algorithm forms a new "baseline" that is to be locally updated S202 in a subsequent iteration of the method S200.

Still further, the method S200 comprises obtaining S204 one or more model parameters of a centrally fine-tuned machine-learning algorithm formed from a consolidated version of the self-supervised machine-learning algorithm from the remote entity. In some embodiments, the vehicle already has access to one (older) version the centrally fine-tuned ML algorithm wherefore it only needs to receive the updated parameters of the centrally fine-tuned ML algorithm in order to obtain (an updated version) of the centrally fine-tuned ML algorithm. However, in some embodiments, all of the model parameters of the centrally fine-tuned ML algorithm may be transmitted from the remote entity and received and stored by the in-vehicle processing system.

The centrally fine-tuned machine-learning algorithm may be understood as the aforementioned teacher network or teacher model that is to be used for a knowledge distillation process following a federated learning methodology as described above. Accordingly, the method S200 further comprises distilling S206 a machine-learning algorithm for an in-vehicle perception module (i.e. a production network) from the centrally fine-tuned machine-learning algorithm acting as a teacher model, wherein the distillation is performed using perception data originating from one or more vehicle-mounted sensors. As before, the perception data may for example comprise raw sensor data or processed sensor data in the form of monocular camera images, stereo camera images, radar images, and/or LiDAR images. It should be note that the images may be single images or image sequences (i.e. a video feed).

These steps related to the local updating S202 of the self-supervised ML algorithm based on perception data, the transmission S203 of the locally updated model parameters, the reception S210 of the consolidated model parameters, and the updating S211 of the self-supervised ML algorithm based on the consolidated model parameters, are, in some embodiments, looped a plurality of times prior to proceeding to the obtaining S204 of the fine-tuned self-supervised ML algorithm.

The method S200 further comprises transmitting S207 one or more model parameters of the distilled S206 machine-learning algorithm to the remote entity, and receiving S208 one or more consolidated model parameters of the machine-learning algorithm for the in-vehicle perception module from the remote entity. Moreover, the method S200 comprises updating S209 the machine-learning algorithm for the in-vehicle perception module based on the received one or more consolidated model parameters. In other words, the teacher network is pushed from the remote entity to the vehicles where "local" knowledge distillation is performed based on input data generated locally in each of the vehicles, these locally distilled production networks are then consolidated centrally and pushed as a global update of the production network to the entire fleet. An advantage of using a federated learning scheme for the knowledge distillation is that the probability of successfully including rare scenarios (edge cases or corner cases) in the knowledge distillation process may be increased, further increasing the performance of the formed production network.

As mentioned, FIG. 3 is a schematic flowchart illustrating the process flow in the entire platform described in the foregoing. Thus, FIG. 3 serves to further elucidate the cooperation between the central entity (sometimes referred to as the central processing system) and the plurality of ADS-equipped vehicles in accordance with some embodiments. However, seeing that the various functions or steps have been discussed in explicit detail in the foregoing in reference to FIGS. 1 and 2, they will for the sake of brevity and conciseness not be repeated.

Executable instructions for performing these functions are, optionally, included in a non-transitory computer-readable storage medium or other computer program product configured for execution by one or more processors.

Figure 4:
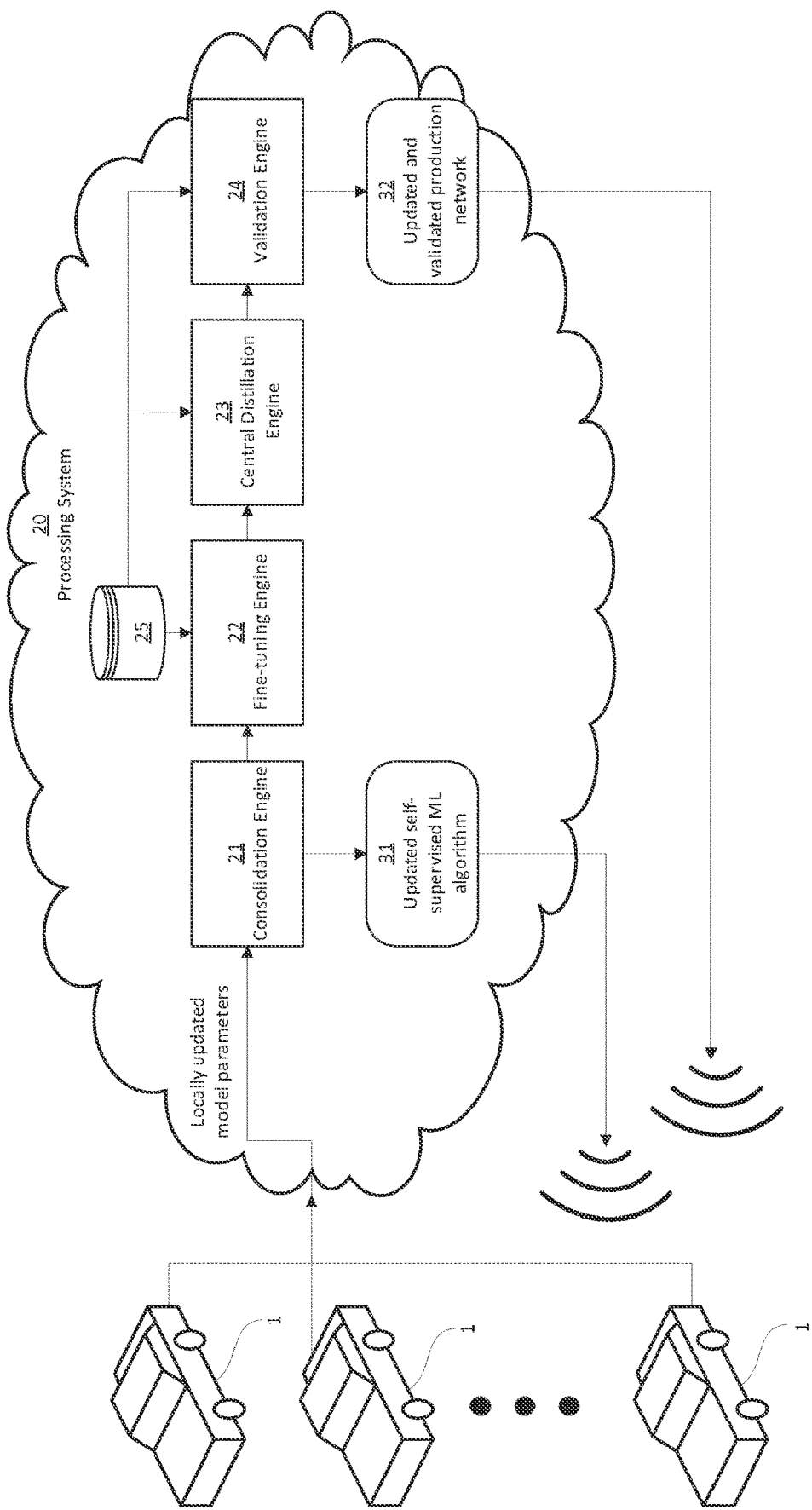
FIG. 4 is a schematic block diagram of a system for updating a perception function of a plurality of ADS-equipped vehicles in accordance with some embodiments.

FIG. 4 is a schematic block diagram representation of a (central) processing system 20 for updating a perception function of a vehicle 1 having an Automated Driving System (ADS) in accordance with some embodiments. In more detail, FIG. 4 serves to further the above-described embodiments related to the central knowledge distillation of the production network by schematically illustrating the flow of information and the various process steps. The processing system 10 comprises control circuitry (e.g. one or more processors) configured to perform the functions of the method S100 disclosed herein, where the functions may be included in a non-transitory computer-readable storage medium or other computer program product configured for execution by the control circuitry. However, in order to better elucidate the present invention, the control circuitry is represented as various "modules" or blocks 21-24 in FIG. 4, each of them linked to one or more specific functions of the control circuitry.

Details related to the consolidation process, distillation process, the fine-tuning process, etc. have been discussed in detail in the foregoing, and will for the sake of brevity and conciseness not be repeated again with respect to FIGS. 4 and 5. It is presumed that the person skilled in the art readily understands that the corresponding examples and features discussed in the foregoing are analogously applicable with respect to FIGS. 4 and 5.

The (central) processing system 20 is capable of transmitting and receiving data to/from a plurality of remote ADS-equipped vehicles 1. Cellular communication technologies may be used for long range communication between the vehicles 1 and the central processing system 20. Examples of cellular radio technologies are GSM, GPRS, EDGE, LTE, 5G, 5G NR, and so on, also including future cellular solutions.

The processing system 20 obtains one or more locally updated model parameters of a self-supervised machine-learning algorithm from a plurality of remote vehicles 1. In more detail, self-supervised machine-learning algorithms are deployed "locally" in each vehicle (e.g. as part of the vehicle's ADS-platform), which can then continuously (or at least while being parked if compute resources are unavailable during operations) ingest the scenes (images) experienced by the ADS for self-supervised learning.

As mentioned in the foregoing, the ADS of the vehicles 1 employ a separate "production network" (see ref. 43 in FIG. 5) for the various operational tasks of the ADS. The vehicles' 1 own processing systems are configured to feed a perceived scene or image into a "self-supervision learning engine" (ref 40 in FIG. 5) and at an appropriate time (e.g. after a predetermined time period, a predetermined number of drives, or a predetermined number of ingested images, etc.) the locally updated self-supervised machine-learning algorithm (or any other data such as network weights, network biases, etc.) is transmitted to the central processing system 20. The process from the vehicle-side is further elaborated upon in reference to FIG. 5.

Moving on, the processing system comprises a consolidation engine/module 21 that is configured to update one or more model parameters of a global self-supervised machine-learning algorithm 31 based on the received one or more locally updated model parameters.

In other words, when the self-supervised machine-learning algorithms are updated at each vehicle 1, the locally updated self-supervised machine-learning algorithms and/or any other data such as network weights, network biases etc., is transferred to the central processing system 20, which consolidates these local updates into a global self-supervised machine-learning algorithm 31. After the consolidation engine 21 has updated the central or global self-supervised machine-learning algorithm 31 the processing system 20 may provide updates to the vehicles 1 in the fleet so that their "local" self-supervised machine-learning algorithms are each able to use a copy of the updated global or central algorithm in some embodiments.

Further, the processing system 20 has a fine-tuning engine/module 22 that is configured to fine-tune the global self-supervised machine-learning algorithm 31 based on an annotated dataset in order to generate a fine-tuned global machine-learning algorithm comprising one or more fine-tuned model parameters. The annotated dataset may for example be stored in a suitable data repository 25 accessible by the fine-tuning engine 22.

The fine-tuned global machine-learning algorithm is subsequently used to form a machine-learning algorithm 32 for an in-vehicle perception module 43 of the plurality of remote vehicles, i.e. it is used to form/update the production network 32 utilized by the ADS of the vehicles 1 in the fleet. In some embodiments, the processing system 20 has a central distillation engine/module 23 configured to distil a machine-learning algorithm 32 for the in-vehicle perception module 43 from the fine-tuned global machine-learning algorithm acting as a teacher model, wherein the distillation is performed using input data in the form of images of traffic scenarios. The input data may for example stored in a suitable data repository 25 accessible by the central distillation engine/module 23.

In some embodiments, the formed production network is subsequently validated, by means of a suitably configured validation engine/module 24. In more detail, the validation engine 24 is configured to compare output of the formed "production network" against a defined ground-truth. However, as readily understood by the skilled reader, the validation process of the formed production network may be more or less elaborate depending on context, specification, and other general requirements. For example, the validation may further include running full-stack simulations one the production network, or even shadow mode testing in open loop in a plurality of ADS-equipped vehicles.

The updated and validated production network is then transmitted to the plurality of ADS-equipped vehicles 1 as part of a global software update procedure.

Figure 5:
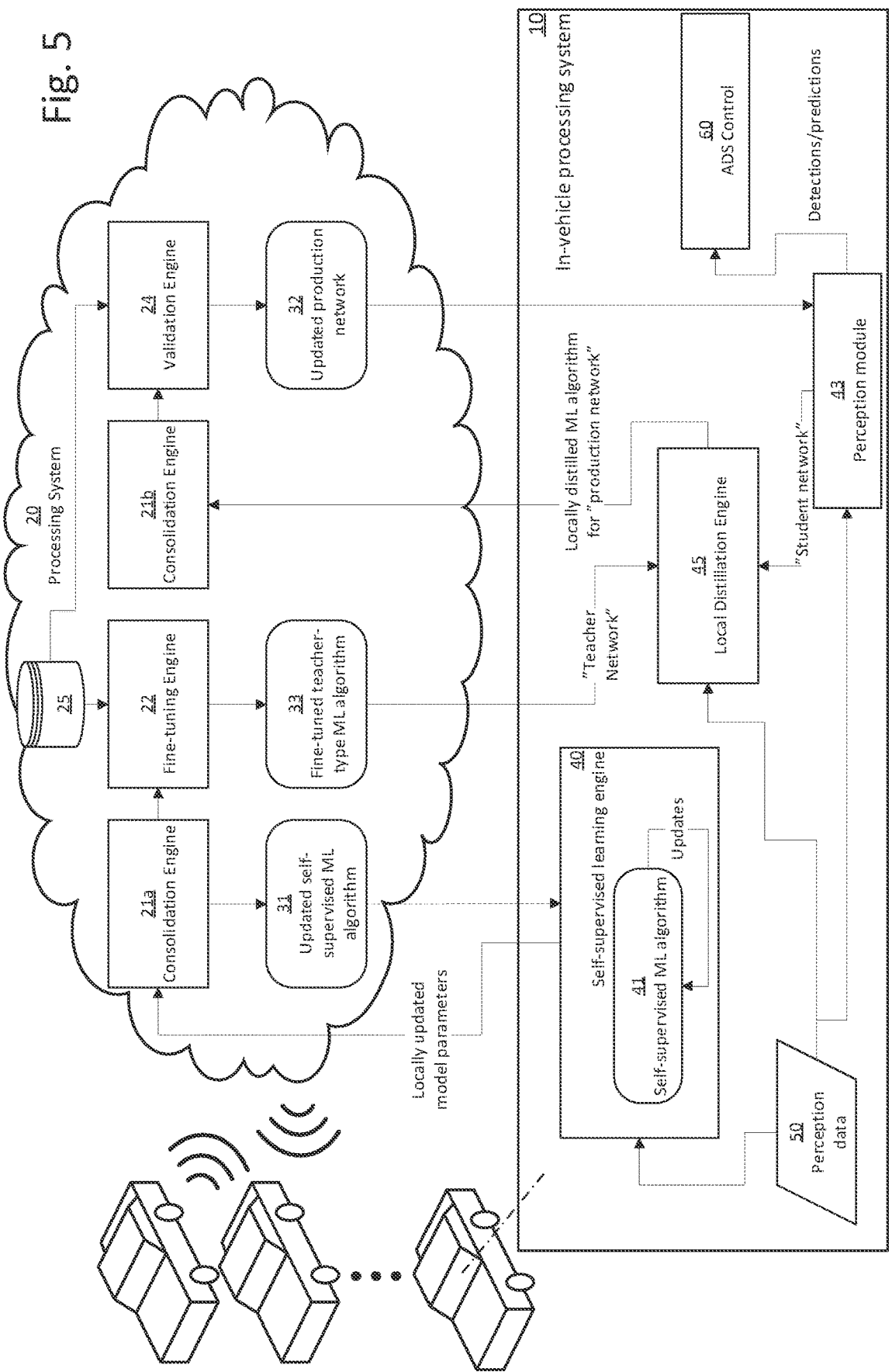
FIG. 5 is a schematic block diagram of a system for updating a perception function of a plurality of ADS-equipped vehicles in accordance with some embodiments.

Turning to FIG. 5, which is a schematic block diagram representation of an in-vehicle processing system 10 for updating a perception function of a vehicle having an Automated Driving System (ADS) in accordance with some embodiments. In more detail, FIG. 5 serves to further the above-described embodiments related to the distributed knowledge distillation of the production network (i.e. in accordance with the federated learning scheme) by schematically illustrating the flow of information and the various process steps. An example of a vehicle 1 comprising an in-vehicle processing system 10 in accordance with some embodiments is also schematically illustrated in FIG. 6.

Each vehicle 1 is provided with an in-vehicle processing system 20. The processing system 10 comprises control circuitry (e.g. one or more processors) 11 configured to perform the functions of the method S200 disclosed herein, where the functions may be included in a non-transitory computer-readable storage medium 12 or other computer program product configured for execution by the control circuitry 11. However, in order to better elucidate the present invention, the control circuitry 11 is represented as various "modules" or blocks 40, 43 in FIG. 5, each of them linked to one or more specific functions of the control circuitry. Moreover, the in-vehicle processing system 10 may be comprised in the ADS-platform of the vehicle, or as a separate module as readily appreciated by the person skilled in the art.

Moving on, the control circuitry 11 is configured to obtain perception data 50 originating from one or more vehicle mounted sensors 6a-c configured to monitor a surrounding environment of the vehicle. The perception data may for example be received in the form of a real-time data stream or from a data buffer or any other suitable data repository where the perception data 50 is at least temporarily stored. In other words, the perception data is obtained from a source on board the vehicle.

Further, the control circuitry 11 is configured to process the obtained perception data using a self-supervised machine-learning algorithm and locally update one or more model parameters of the self-supervised machine-learning algorithm 41. The in-vehicle processing system 10 may accordingly comprise a self-supervised learning engine 40 configured to train the self-supervised ML algorithm, e.g. by manipulating (e.g. withholding) parts of an image and instructing the algorithm 41 to reconstruct the manipulated image as part of its learning process, as discussed in the foregoing. The locally updated model parameters of the self-supervised ML algorithm are subsequently transmitted to a remote entity 20, where they are consolidated 21a with corresponding contributions from other vehicles 1 in the fleet so to form a global self-supervised machine-learning algorithm 31. The consolidated global self-supervised machine-learning algorithm 31 (or one or more updated parameters thereof) may subsequently be pushed to the fleet of vehicles 1 from the remote entity 20.

Still further, the control circuitry 11 is configured to obtain a centrally fine-tuned machine-learning algorithm 33 formed from a consolidated version of the self-supervised machine-learning algorithm, i.e. from a global self-supervised ML algorithm 31, from the remote entity 20. The control circuitry 11 is further configured to distil a machine-learning algorithm for an in-vehicle perception module from the centrally fine-tuned machine-learning algorithm 33 acting as a teacher model, wherein the distillation is performed using perception data 50 obtained from one or more vehicle-mounted sensors 6a-c. In other words, the in-vehicle processing system 10 has a local distillation engine/module 45 that receives the perception data 50, the fine-tuned ML algorithm 33 and the production network, and updates the production network in accordance with a knowledge distillation process as discussed in the foregoing. Here, the fine-tuned ML algorithm 33 forms the teacher network/model and the production network forms the student network/model.

As mentioned, the production network is the ML algorithm used by the ADS's perception module 43 for one or more specific perception functions (e.g. object classification, segmentation, etc.) for providing a perception output as an input to one or more ADS control functions 60 (e.g. for manoeuvring the vehicle 1). A perception module 43 is in the present context to be understood as a system responsible for acquiring raw sensor data from on-board sensors 6a, 6b, 6c such as cameras, LIDARs and RADARs, ultrasonic sensors, etc. and converting this raw data into scene understanding.

Once the production network has been updated locally through a local knowledge distillation, the control circuitry 11 is configured to transmit one or more model parameters of the distilled machine-learning algorithm to the remote entity 20. The locally updated model parameters of the locally distilled production network are subsequently transmitted to the remote entity 20, where they are consolidated 21b with corresponding contributions from other vehicles 1 in the fleet so to form a consolidated production network 32. The consolidated production network 32 (or one or more parameters thereof) are pushed to the fleet of vehicles 1 from the remote entity 20. As elaborated upon in the foregoing, several of these steps may be performed one or more times in the form of "inner loops" before the consolidated production network 32 is considered to be fully distilled from the teacher network.

Accordingly, the control circuitry 11 is further configured to receive one or more consolidated model parameters of the machine-learning algorithm for the in-vehicle perception module 33 from the remote entity 20.

In some embodiments, the consolidated production network may be subdued to a validation procedure before it is pushed out as an enforced update of the production networks in the vehicles 1. The validation procedure may be performed offline (i.e. by the processing system), online (i.e. in the vehicles) or a combination thereof. In some embodiments, the formed production network (after consolidation) may be pushed out to one or more vehicles 1 in the fleet for shadow-mode testing or open-loop testing as known in the art. Once the production network has been validated, it can be rolled out to replace the currently deployed version of the production network in the vehicles 1.

Figure 6:
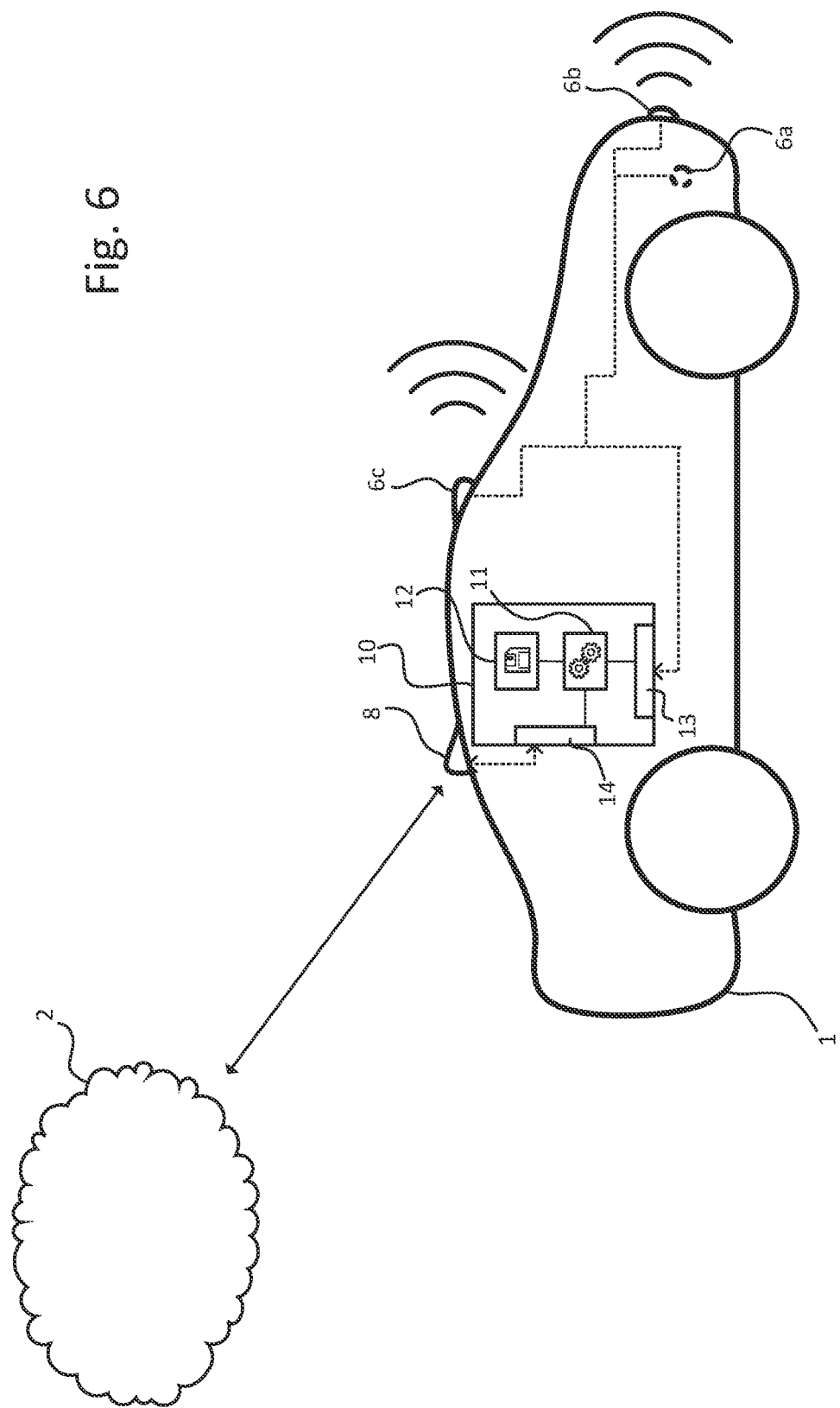
FIG. 6 is a schematic illustration of a vehicle comprising for updating a perception function of an ADS-equipped vehicle in accordance with some embodiments.

In reference to FIG. 6, the in-vehicle processing system 10 comprises one or more processors 11, a memory 12, a sensor interface 13 and a communication interface 14. The processor(s) 11 may also be referred to as a control circuit 11 or control circuitry 11. The control circuitry 11 is configured to execute instructions stored in the memory 12 to perform a method for updating a perception function of a vehicle having an Automated Driving System (ADS) according to any one of the embodiments disclosed herein. Stated differently, the memory 12 of the control device 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices.

Further, the vehicle 1 may be connected to external network(s) 2 via for instance a wireless link (e.g. for transmitting and receiving data). The same or some other wireless link may be used to communicate with other vehicles in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

In summary, and in accordance with the technology disclosed herein, self-supervised networks are deployed locally in each of a plurality of ADS-equipped vehicles. These networks can then continuously (or at least while being parked if computational resources are unavailable during operations) ingest the scenes (images) experienced by the ADS for self-supervised learning. However, for real-time operation the ADS employs a separate "production" network that is only updated through "over-the-air updates" (e.g. from a central server). In more detail, in the ADS-equipped vehicles, the perceived scene/image is fed into a self-supervision learning engine and at an appropriate time (e.g. after a predetermined time, number of drives, or ingested images, etc.) the updated self-supervised network is transmitted to the central server.

At the central server, the locally updated models across the fleet are received and they are combined or consolidated into a new updated global model that incorporates the teachings from all of the local models. This scheme is commonly called federated learning (FL). This updated global model is subsequently used as a "pre-trained model", that is to be trained so to form a teacher model using a training dataset comprising annotated data.

The teacher model is used to train the target production network (the student) using knowledge distillation. This may be understood as a process where one model transfers its knowledge to another model. Typically, the same input (e.g. image) is presented to both the student model and the teacher model and the student model is trained to mimic the output of the teacher model. An advantage of using this knowledge distillation procedure is that the high performance level exhibited by the teacher model may, at least to some extent, be transferred to a "lighter" model, i.e. a model requiring less computational resources to operate.

The knowledge distillation may be realized either as a central process or as a local process in the vehicles in a federated manner. Both methods of knowledge distillation result in a production network candidate in the cloud. This candidate is then validated and assured according to validation procedures and finally pushed to the fleet as an update, thereby concluding one full cycle of an example embodiment proposed herein.

The present invention has been presented above with reference to specific embodiments. However, other embodiments than the above described are possible and within the scope of the invention. Different method steps than those described above, performing the method by hardware or software, may be provided within the scope of the invention. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods performed by the central processing system as presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) (associated with the processing systems 10, 20) may be or include any number of hardware components for conducting data or signal processing or for executing computer code stored in memory. The processing system have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the invention. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present invention. Other solutions, uses, objectives, and functions within the scope of the invention as claimed in the below described patent embodiments should be apparent for the person skilled in the art.

The invention claimed is:

1. A computer-implemented method for updating a perception function of a plurality of vehicles having an Automated Driving System (ADS), the method (S100) comprising:
   obtaining one or more locally updated model parameters of a self-supervised machine-learning algorithm from a plurality of remote vehicles;
   updating one or more model parameters of a global self-supervised machine-learning algorithm based on the obtained one or more locally updated model parameters;
   fine-tuning the global self-supervised machine-learning algorithm based on an annotated dataset in order to generate a fine-tuned global machine-learning algorithm comprising one or more fine-tuned model parameters;
   forming a machine-learning algorithm for an in-vehicle perception module based on the fine-tuned global machine-learning algorithm; and
   transmitting one or more model parameters of the formed machine-learning algorithm for the in-vehicle perception module to the plurality of remote vehicles.

2. The method according to claim 1, wherein the forming of the machine-learning algorithm for the in-vehicle perception module comprises:
   distilling a machine-learning algorithm for the in-vehicle perception module from the fine-tuned global machine-learning algorithm acting as a teacher model, wherein the distillation is performed using input data in the form of images of traffic scenarios.

3. The method according to claim 1, wherein the forming of the machine-learning algorithm for the in-vehicle perception module comprises:
   transmitting the fined-tuned model parameters of the fined-tuned global self-supervised machine-learning algorithm to the plurality of remote vehicles;
   obtaining one or more locally distilled model parameters of the machine-learning algorithm for the in-vehicle perception module from each of the plurality of remote vehicles; and
   forming the machine-learning algorithm for the in-vehicle perception module based on a consolidation of the one or more locally distilled model parameters.

4. The method according to claim 1, wherein the forming of the machine-learning algorithm for the in-vehicle perception module comprises:
   validating the formed machine-learning algorithm for the in-vehicle perception module based on an annotated dataset prior to the transmission of the one or more model parameters of the formed machine-learning algorithm for the in-vehicle perception module.

5. The method according to claim 4, further comprising:
   transmitting the one or more updated model parameters of the global self-supervised machine-learning algorithm to the plurality of remote vehicles.

6. A non-transitory computer-readable storage medium storing one or more programs configured to be executed by one or more processors of a processing system, the one or more programs comprising instructions for performing the method according to claim 1.

7. A processing system for updating a perception function of a vehicle having an Automated Driving System (ADS), the processing system comprising control circuitry configured to:
   obtain one or more locally updated model parameters of a self-supervised machine-learning algorithm from a plurality of remote vehicles;
   update one or more model parameters of a global self-supervised machine-learning algorithm based on the obtained one or more locally updated model parameters;
   fine-tune the global self-supervised machine-learning algorithm based on an annotated dataset in order to generate a fine-tuned global machine-learning algorithm comprising one or more fine-tuned model parameters;
   form a machine-learning algorithm for an in-vehicle perception module based on the fine-tuned global machine-learning algorithm; and
   transmit one or more model parameters of the formed machine-learning algorithm for the in-vehicle perception module to the plurality of remote vehicles.

8. The processing system according to claim 7, wherein the control circuitry is configured to form the machine-learning algorithm for the in-vehicle perception module by being configured to:
   distil a machine-learning algorithm for the in-vehicle perception module from the fine-tuned global machine-learning algorithm acting as a teacher model, wherein the distillation is performed using input data in the form of images of traffic scenarios.

9. The processing system according to claim 7, wherein the control circuitry is configured form the machine-learning algorithm for the in-vehicle perception module by being configured to:
   transmit the fined-tuned model parameters of the fined-tuned global self-supervised machine-learning algorithm to the plurality of remote vehicles;
   obtain one or more locally distilled model parameters of a local machine-learning algorithm for the in-vehicle perception module from each of the plurality of remote vehicles; and
   form the machine-learning algorithm for the in-vehicle perception module based on a consolidation of the one or more locally distilled model parameters.

10. A remote server comprising the processing system according to claim 7.

11. A cloud environment comprising one or more remote servers according to claim 10.

12. A computer-implemented method, performed by an in-vehicle processing system, for updating a perception function of a vehicle having an Automated Driving System (ADS), the method comprising:
   obtaining perception data from one or more vehicle-mounted sensors configured to monitor a surrounding environment of the vehicle;
   processing the obtained perception data using a self-supervised machine-learning algorithm and locally updating one or more model parameters of the self-supervised machine-learning algorithm;
   transmitting the locally updated model parameters of the self-supervised machine-learning algorithm to a remote entity;
   obtaining a centrally fine-tuned machine-learning algorithm formed from a consolidated version of the self-supervised machine-learning algorithm from the remote entity;
   distilling a machine-learning algorithm for an in-vehicle perception module from the centrally fine-tuned machine-learning algorithm acting as a teacher model, wherein the distillation is performed using perception data obtained from one or more vehicle-mounted sensors;

transmitting one or more model parameters of the distilled machine-learning algorithm to the remote entity;

receiving one or more consolidated model parameters of the machine-learning algorithm for the in-vehicle perception module from the remote entity; and updating the machine-learning algorithm for the in-vehicle perception module (43) based on the received one or more consolidated model parameters.

13. A non-transitory computer-readable storage medium storing one or more programs configured to be executed by one or more processors of an in-vehicle processing system, the one or more programs comprising instructions for performing the method according to claim 12.

14. An in-vehicle processing system for updating a perception function of a vehicle having an Automated Driving System (ADS), the processing system comprising control circuitry configured to:

obtain perception data from one or more vehicle-mounted sensors configured to monitor a surrounding environment of the vehicle;

process the obtained perception data using a self-supervised machine-learning algorithm and locally update one or more model parameters of the self-supervised machine-learning algorithm;

transmit the locally updated model parameters of the self-supervised machine-learning algorithm to a remote entity;

obtain a centrally fine-tuned machine-learning algorithm formed from a consolidated version of the self-supervised machine-learning algorithm from the remote entity;

distil a machine-learning algorithm for an in-vehicle perception module from the centrally fine-tuned machine-learning algorithm acting as a teacher model, wherein the distillation is performed using perception data obtained from one or more vehicle-mounted sensors;

transmit one or more model parameters of the distilled machine-learning algorithm to the remote entity;

receive one or more consolidated model parameters of the machine-learning algorithm for the in-vehicle perception module from the remote entity; and update the machine-learning algorithm for the in-vehicle perception module based on the received one or more consolidated model parameters.

15. A vehicle comprising:

an Automated Driving System (ADS); and an in-vehicle processing system according to claim 14.

* * * * *